(12) United States Patent
Barimani et al.

(10) Patent No.: US 10,927,515 B2
(45) Date of Patent: Feb. 23, 2021

(54) SELF-PROPELLED MILLING MACHINE, METHOD FOR AUTOMATICALLY LOADING A MEANS OF TRANSPORT WITH MILLING MATERIAL, AS WELL AS ROAD OR GROUND WORKING UNIT

(71) Applicant: Wirtgen GmbH, Windhagen (DE)

(72) Inventors: Cyrus Barimani, Königswinter (DE); Christian Berning, Zuelpich (DE); Tobias Krista, Alfter-Oedekoven (DE); Bernd Walterscheid, Sankt Augustin-Buisdorf (DE)

(73) Assignee: WIRTGEN GMBH

( * ) Notice: Subject to any disclaimer, the term of this patent is extended or adjusted under 35 U.S.C. 154(b) by 161 days.

(21) Appl. No.: 16/191,492

(22) Filed: Nov. 15, 2018

(65) Prior Publication Data

US 2019/0153682 A1    May 23, 2019

(30) Foreign Application Priority Data

Nov. 22, 2017    (DE) .................... 10 2017 220 869.4

(51) Int. Cl.
*E01C 23/088* (2006.01)
*E01C 23/12* (2006.01)
(Continued)

(52) U.S. Cl.
CPC .......... *E01C 23/088* (2013.01); *E01C 23/127* (2013.01); *B65G 41/002* (2013.01); *B65G 65/06* (2013.01); *B65G 67/22* (2013.01)

(58) Field of Classification Search
CPC ...... E01C 23/065; E01C 23/08; E01C 23/088; E01C 23/127
(Continued)

(56) References Cited

U.S. PATENT DOCUMENTS 3,608,968 A    9/1971  Burnett
4,376,609 A    3/1983  Bohman et al.
(Continued)

FOREIGN PATENT DOCUMENTS

AU    2015215954 A1    3/2016
CN    103397884 A    11/2013
(Continued)

OTHER PUBLICATIONS

Database Compendex XP-002538700, Engineering Information, Inc., Wolski Jan K, "Optimization of Bucket Wheel Excavator and Pit Parameters in Application to Overburden Stripping", Conference Proceeding "Use of Computers in the Coal Industry",1986, pp. 43-55.
(Continued)

*Primary Examiner* — Janine M Kreck
*Assistant Examiner* — Michael A Goodwin
(74) *Attorney, Agent, or Firm* — Lucian Wayne Beavers; Gary L. Montle; Patterson Intellectual Property Law, PC (57) ABSTRACT

A self-propelled milling machine includes a controller which continuously locates an alterable position of a loading surface and of a slewable transport conveyor relative to a machine frame, or the position of the loading surface relative to the transport conveyor, and automatically controls one or more of the slewing angle, the elevation angle and the conveying speed of the transport conveyor, wherein discharged milling material impinges on pre-calculated points of impingement within the loading surface. The controller determines correction factors for the control parameter(s) as a function of a transverse inclination about the longitudinal central axis of the loading surface, a position angle between the longitudinal central axis of the loading surface and the longitudinal central axis of the transport conveyor or that of the machine frame, and/or the position of the pre-calculated
(Continued)

point of impingement relative to an end of the loading surface lying on the longitudinal central axis.

20 Claims, 7 Drawing Sheets

(51) Int. Cl.
    *B65G 65/06*     (2006.01)
    *B65G 67/22*     (2006.01)
    *B65G 41/00*     (2006.01)

(58) Field of Classification Search
    USPC .................. 299/1.9, 1.5, 1.4, 18, 39.2, 39.4;
                      198/315, 316.1, 317, 318, 319, 320;
                      404/84.05, 84.1, 94; 460/114, 115;
                      701/50
See application file for complete search history.

(56) References Cited

U.S. PATENT DOCUMENTS

| | | | |
|---|---|---|---|
| 4,647,248 A | 3/1987 | Wirtgen | |
| 4,863,009 A | 9/1989 | Winkel et al. | |
| 5,178,253 A | 1/1993 | Fix | |
| 5,575,316 A | 11/1996 | Pollklas | |
| 5,749,783 A | 5/1998 | Pollklas | |
| 5,857,274 A | 1/1999 | Ruediger et al. | |
| 6,247,510 B1 | 6/2001 | Diekhans et al. | |
| 6,366,684 B1 | 4/2002 | Gerard et al. | |
| 6,682,416 B2 | 1/2004 | Behnke et al. | |
| 6,718,746 B2 | 4/2004 | Hettiger et al. | |
| 6,943,824 B2 | 9/2005 | Alexia et al. | |
| 7,831,345 B2 | 11/2010 | Heino et al. | |
| 8,337,118 B2 | 12/2012 | Buschmann et al. | |
| 8,348,044 B2 | 1/2013 | Tebbe et al. | |
| 8,499,537 B2 | 8/2013 | Correns et al. | |
| 8,528,988 B2 | 9/2013 | Von Schnebeck et al. | |
| 8,590,983 B2 | 11/2013 | Berning et al. | |
| 8,690,474 B2 | 4/2014 | Jurasz et al. | |
| 8,755,976 B2* | 6/2014 | Peters .................. | A01B 69/008 382/106 |
| 8,979,424 B2 | 3/2015 | Berning et al. | |
| 9,126,776 B2 | 9/2015 | Von Schnebeck et al. | |
| 9,809,937 B2 | 11/2017 | Berning et al. | |
| 9,873,993 B2 | 1/2018 | Berning et al. | |
| 10,400,400 B2 | 9/2019 | Berning et al. | |
| 2003/0174207 A1 | 9/2003 | Alexia et al. | |
| 2005/0179309 A1 | 8/2005 | Berning et al. | |
| 2005/0207841 A1 | 9/2005 | Holl et al. | |
| 2006/0045621 A1 | 3/2006 | Potts et al. | |
| 2006/0094487 A1 | 5/2006 | Huster et al. | |
| 2007/0122236 A1 | 5/2007 | Gaertner et al. | |
| 2008/0153402 A1 | 6/2008 | Arcona et al. | |
| 2008/0173740 A1 | 7/2008 | Parker et al. | |
| 2008/0245042 A1 | 10/2008 | Brunnert et al. | |
| 2008/0258535 A1 | 10/2008 | Berning et al. | |
| 2009/0044505 A1 | 2/2009 | Huster et al. | |
| 2009/0229233 A1 | 9/2009 | Pollklas et al. | |
| 2009/0267402 A1 | 10/2009 | Berning et al. | |
| 2010/0014917 A1 | 1/2010 | Willis et al. | |
| 2010/0063692 A1 | 3/2010 | Madsen et al. | |
| 2010/0070144 A1 | 3/2010 | Burke et al. | |
| 2010/0296867 A1 | 11/2010 | Buschmann et al. | |
| 2011/0061762 A1 | 3/2011 | Madsen et al. | |
| 2011/0064274 A1 | 3/2011 | Madsen et al. | |
| 2011/0066337 A1* | 3/2011 | Kormann ............. | A01D 43/073 701/50 |
| 2011/0080034 A1 | 4/2011 | Schnebeck et al. | |
| 2011/0123268 A1 | 5/2011 | Berning et al. | |
| 2011/0213531 A1 | 9/2011 | Farley et al. | |
| 2011/0307149 A1 | 12/2011 | Pighi et al. | |
| 2013/0076101 A1 | 3/2013 | Simon | |
| 2013/0080000 A1* | 3/2013 | Von der Lippe ...... | E01C 23/088 701/50 |
| 2014/0054949 A1 | 2/2014 | Berning et al. | |
| 2014/0077579 A1 | 3/2014 | Berning et al. | |
| 2015/0218762 A1* | 8/2015 | Berning ................ | E01C 23/127 299/1.9 |
| 2016/0160454 A1 | 6/2016 | Berning et al. | |
| 2016/0208447 A1 | 7/2016 | Berning et al. | |
| 2018/0202116 A1 | 7/2018 | Berning et al. | |
| 2019/0153682 A1 | 5/2019 | Barimani et al. | |

FOREIGN PATENT DOCUMENTS

| | | |
|---|---|---|
| CN | 103628397 A | 3/2014 |
| CN | 103628398 A | 3/2014 |
| CN | 203654144 U | 6/2014 |
| CN | 203700926 U | 7/2014 |
| CN | 105386395 B | 8/2017 |
| CN | 210086006 U | 2/2020 |
| DE | 155157 A1 | 5/1982 |
| DE | 19628420 A1 | 1/1998 |
| DE | 102005035480 A1 | 2/2007 |
| DE | 202007005756 U1 | 10/2008 |
| DE | 102009041842 A1 | 9/2011 |
| DE | 102012215005 A1 | 2/2014 |
| DE | 102012215013 A1 | 2/2014 |
| DE | 102013009361 A1 | 12/2014 |
| DE | 102014216713 A1 | 2/2016 |
| EA | 22806 B1 | 3/2016 |
| EP | 666018 A1 | 8/1995 |
| EP | 1344445 A1 | 9/2003 |
| EP | 1574122 A1 | 9/2005 |
| EP | 2100495 A1 | 9/2009 |
| EP | 2301318 A1 | 3/2011 |
| EP | 2452551 A2 | 5/2012 |
| EP | 2573266 A2 | 3/2013 |
| EP | 2573267 A1 | 3/2013 |
| EP | 2700748 A1 | 2/2014 |
| EP | 2987911 A1 | 2/2016 |
| EP | 3489415 A1 | 5/2019 |
| JP | 61257118 A | 11/1986 |
| JP | 09086672 A | 3/1997 |
| JP | 11050415 A | 2/1999 |
| JP | 2008163734 A | 7/2008 |
| JP | 2009263136 A | 11/2009 |
| RU | 2394122 C1 | 7/2010 |
| RU | 2611802 C2 | 3/2017 |
| WO | 2009098294 A2 | 8/2009 |
| WO | 2014029824 A1 | 2/2014 |

OTHER PUBLICATIONS

Database Compendex XP-002538699, Engineering Information, Inc., Gove et al. "Optimizing Truck-Loader Matching", Mining Engineering, Oct. 1994, pp. 1179-1185, Soc. for Mining, Metallurgy & Exploration, Inc.
European Search Report for corresponding patent application No. EP 18 20 2510 dated Jan. 22, 2019 (not prior art).
China Search Report for corresponding CN 201811412767, dated Aug. 21, 2020, 3 pages (not prior art).

* cited by examiner

SELF-PROPELLED MILLING MACHINE, METHOD FOR AUTOMATICALLY LOADING A MEANS OF TRANSPORT WITH MILLING MATERIAL, AS WELL AS ROAD OR GROUND WORKING UNIT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of German Patent Application No. 10 2017 220 869.4, filed Nov. 22, 2017, and which is hereby incorporated by reference.

BACKGROUND

The invention relates to various embodiments of a self-propelled milling machine, a method for automatically loading a means of transport with milling material, as well as a road or ground working unit.

It is known for a self-propelled milling machine to unload the milling material onto at least one means of transport comprising a loading surface.

The milling machine comprises a controller for the travelling and milling operation, as well as a working drum for the milling of, for example, a road pavement. A material transport device, for example, a material transport device comprising, as a minimum, one transport conveyor is located in front of or behind the working drum as seen in the direction of travel.

Rear-loading milling machines comprise a slewable transport conveyor at the rear end of the machine. The conveying direction of the slewable transport conveyor is opposite to the direction of operation of the rear-loading milling machine in which the milling machine is driving.

In front-loading milling machines, two transport conveyors may be specified, the last transport conveyor of which, as seen in the conveying direction, is slewable. In this design, the conveying direction always corresponds to the direction of operation.

The slewable transport conveyor comprises a discharge end at which, due to the conveying speed, the milling material is unloaded onto the loading surface of the at least one means of transport via a flight path in the form of a parabolic trajectory. The slewable transport conveyor of the material transport device may be slewed, relative to the longitudinal axis of the milling machine, laterally under a presettable slewing angle to the left or right, and may be adjustable in height at the discharge end via a presettable elevation angle. The conveying speed of the slewable transport conveyor may also be adjustable. In practical operation, problems arise in coordinating the milling machine with the means of transport, for example, a transport vehicle.

With a front-loading milling machine, the milling material is discharged, for example, towards the front onto the transport vehicle driving ahead. The operator of the milling machine needs to signal to the vehicle driver of the transport vehicle as to when the transport vehicle is to continue moving forward and when it is to stop. This leads to problems because the operator basically needs to concentrate on the milling process and at the same time needs to avoid a collision with the transport vehicle driving ahead.

A further problem consists in the fact that the operator of the milling machine also needs to deal with the optimum loading of the loading surface by adjusting the slewing angle, the elevation angle and the conveying speed of the slewable transport conveyor of the material transport device, and is thus distracted from his original task of carrying out the milling operation. An alteration of the slewing angle may be necessary, for example, when altering the steering direction of the milling machine or of the transport vehicle, or to ensure uniform loading of the loading surface.

In the case of a rear-loading milling machine, difficulties also arise in coordinating the milling machine with the transport vehicle, especially since the transport vehicle needs to drive behind the milling machine in reverse travel. An even higher level of stress results for the operator of the milling machine, since he needs to control the milling process in forward travel on the one hand, and on the other hand needs to monitor loading of the transport vehicle behind the milling machine as seen in the direction of travel, needs to control the slewing angle, the elevation angle and/or the conveying speed of the material transport device, and needs to communicate the necessary information for the stop-and-go operation to the vehicle driver.

For reasons of design, the slewing angle range of the material transport device is limited mechanically to approx. 30° in both directions, starting from the central position, for rear-loading milling machines and to approx. 60° for front-loading milling machines.

When controlling the slewing angle, there is the problem that, due to the many influencing factors such as, for example, changes in the direction of the road milling machine and/or the transport vehicle, different designs of transport vehicles, the distance to the transport vehicle, the intermittent operation of the transport vehicle, the operator of the milling machine is quickly overwhelmed so that, in unfavourable circumstances, the milling material may also come down next to the loading surface of the transport vehicle. This is accompanied not only by the loss of the milling material but, in some circumstances, also by extensive rework, namely, if the milling material lost comes to lie on a traffic lane extending next to the milling cut from which it needs to be removed again.

In this respect, it is known from DE 10 2012 215 013 A to automate the unloading procedure, in which case in particular the slewing angle of the last or single transport conveyor of the self-propelled milling machine as seen in the direction of transport is also automatically controllable.

Inadvertent controlling errors may also occur in the case of an automatic unloading procedure.

In this respect, it is known from generic DE 10 2014 216 713 that a controller presets and monitors limit values of a maximum permissible slewing angle range for slewing the transport conveyor which is variable as a function of the current operating situation, wherein a control system continuously controls at least one of the following control parameters, namely, the slewing angle, the elevation angle and the conveying speed of the transport conveyor, automatically in such a fashion that the discharged milling material impinges on a pre-calculated point of impingement within the loading surface. It is known in this design to preset the desired point of impingement and to control the control parameters in order to influence the position of said point of impingement.

BRIEF SUMMARY

It is therefore an object of the invention to optimize a self-propelled milling machine, a method for automatically loading a means of transport with milling material from a milling machine, as well as a road or ground working unit to the effect that, during automatic loading, the point of impingement of the conveying material calculated based on the control parameters conveying speed, elevation angle and/or slewing angle of the slewable transport conveyor is corrected on the basis of changing boundary conditions. An objective is to optimize the loading process taking into account the boundary conditions, or to prevent unfavourable loading states, respectively.

The invention advantageously specifies for the control system to determine correction factors for the at least one control parameter as a function of at least one of the following parameters describing the alterable boundary conditions for the position of the loading surface, namely, the transverse or lateral inclination about the longitudinal central axis of the loading surface, a position angle between the longitudinal central axis of the loading surface and the longitudinal central axis of the transport conveyor or the longitudinal central axis of the machine frame, and the position of the pre-calculated point of impingement relative to an end of the loading surface lying on the longitudinal central axis of the loading surface. As a result, the desired point of impingement is shifted on the basis of specific boundary conditions. The control parameters are controlled in such a fashion that loading onto a corrected point of impingement is made possible. Correction factors for the control parameters are determined from the altered boundary conditions. In this context, the transverse inclination of the loading surface refers to a transverse inclination about the longitudinal central axis of the loading surface relative to a horizontally aligned loading surface.

Such control operation makes it possible to optimize the loading process in the case of automatic conveyor control, taking into account the boundary conditions, and prevents unfavourable loading states.

Taking into account correction factors increases the accuracy of the loading operation and helps to prevent milling material losses.

As has been explained earlier, a controller is already known which controls the conveying speed as well as the elevation angle and slewing angle of the slewable transport conveyor in order to unload the milling material onto a preset point of impingement. According to the invention, the position of the point of impingement is to be corrected as a function of boundary conditions in order to achieve an increased reliability of the control operation. To this end, at least one correction factor is applied to at least one of the control parameters, for example, the slewing angle, in order to achieve a correction of the position of the point of impingement.

A preferred embodiment specifies for the control system to determine a first correction factor for the control parameter slewing angle as a function of a lateral inclination of the loading surface about a longitudinal central axis of the means of transport in such a fashion that the slewing angle of the slewable transport conveyor preset by the controller is increased in the direction of the excessive elevation of the transverse inclination relative to the transport conveyor. If the loading surface is elevated on the right-hand side, for example, or is lowered on the left-hand side, the slewing angle is increased towards the right and vice-versa.

The first correction factor therefore enables material losses to be prevented and the accuracy of the control operation to be increased even in the event of an inclined position of the means of transport, for example, the truck, relative to the milling machine. The situation may arise when the means of transport is following, for example, a rear-loading milling machine and, due to its track width or the width of the milling cut, cannot drive entirely inside the already milled milling cut and is therefore driving, with the wheels of the one side of the means of transport, inside the milling cut and, with the wheels of the other side, on an as yet non-milled section. The same may also occur with a front-loading milling machine when the means of transport is driving, on one side, on a previously milled adjacent cut.

A further preferred embodiment specifies that, to shift the point of impingement, the control system determines a further correction factor for at least one of the control parameters as a function of the position angle between the longitudinal central axis of the transport conveyor or the longitudinal central axis of the machine frame and the longitudinal central axis of the loading surface.

The further correction factor enables the point of impingement calculated based on the control parameters conveying speed, elevation angle and slewing angle to be corrected, and therefore shifted, by a correction value as a function of the position angle in order to more reliably avoid discharging the milling material in particular beyond the sides of the loading surface.

It may also be specified in this design for the slewing angle preset by the controller according to the invention to be corrected, namely, increased by an additional correction factor in the direction of the position angle altered from the initial position of the longitudinal central axes of the transport conveyor or the machine frame, respectively, and the loading surface.

With an increasing amount of the position angle, the conveying speed of the transport conveyor and/or the elevation angle of the transport conveyor may additionally be reduced.

According to a further preferred embodiment, it is specified that, to shift the point of impingement, the control system determines a further correction factor for the control parameter elevation angle and/or conveying speed as a function of the position of the precalculated point of impingement relative to the forward or rear end of the loading surface.

This enables the conveying speed of the transport conveyor to be controlled to a maximum value in the case of a front loader, for example, when the point of impingement has nearly reached the forward end of the loading surface as seen in the conveying direction. The conveying speed, and therefore the discharge range of the milling material, can thus be reduced as required if the distance between the milling machine and the means of transport decreases, for example, because the driver of the means of transport, in the case of a front loader, continues too late in the direction of operation. In the case of a rear loader, a corresponding situation would arise if the driver of the means of transport did not stop or stopped too late.

It is, in particular, specified for the control system to determine the further correction factor for the conveying speed to be preset as a function of the position of the pre-calculated point of impingement within the loading surface in such a fashion that the conveying speed is increased steplessly up to the maximum when the point of impingement moves in the direction of the forward end of the loading surface as seen in the conveying direction, and the conveying speed is reduced compared to the maximum conveying speed when the point of impingement moves in the direction of the rear end of the loading surface as seen in the conveying direction. At the rear end of the loading surface, the conveying speed should be corrected to a minimum value.

It is preferably specified for the conveying speed to be reduced steplessly compared to the maximum conveying speed to a minimum value of 60%, preferably 70%, of the maximum conveying speed when the point of impingement moves in the direction of the rear end of the loading surface as seen in the conveying direction.

According to the method according to the invention, it is specified that correction factors for the at least one control parameter are determined as a function of at least one of the following parameters describing the alterable position of the loading surface, namely, the transverse or lateral inclination of the loading surface about the longitudinal central axis of the loading surface, a position angle between the longitudinal central axis of the loading surface and the longitudinal central axis of the transport conveyor or the longitudinal central axis of the milling machine, and the position of the pre-calculated point of impingement relative to an end of the loading surface lying on the longitudinal central axis.

The invention further relates to a road or ground working unit comprising a self-propelled milling machine and, as a minimum, one means of transport movable independently of the milling machine and positionable relative to the milling machine in such a fashion that the milling material worked off by the milling machine is unloadable onto the means of transport.

BRIEF DESCRIPTION OF THE SEVERAL VIEWS OF THE DRAWINGS

Hereinafter, embodiments of the invention are illustrated in more detail with reference to the drawings.

DETAILED DESCRIPTION

Figure 1:
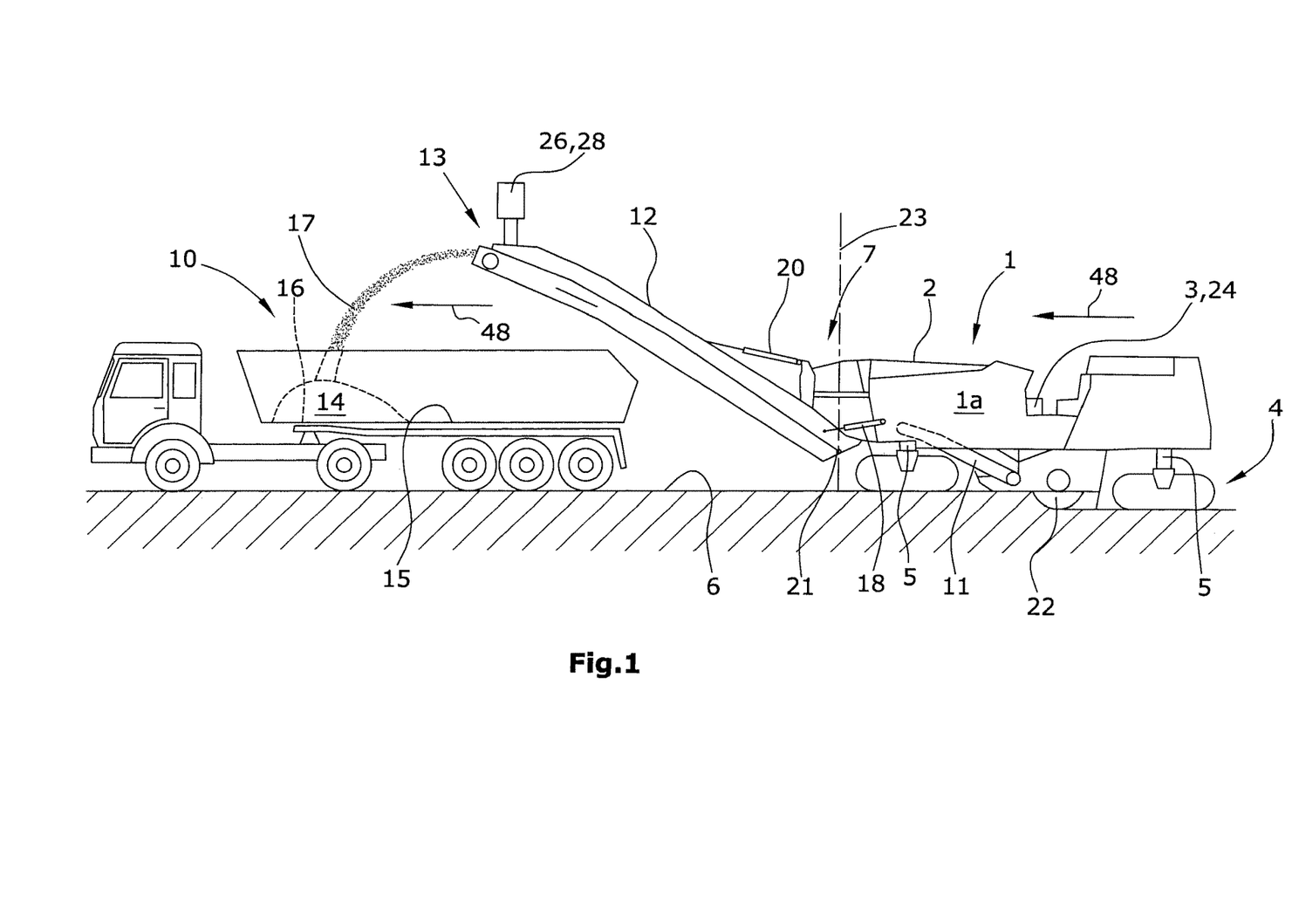
FIG. 1 shows a front-loading road milling machine.

FIG. 1 shows a milling machine 1 using as an example a front-loading road milling machine 1a. Said milling machine 1 comprises a machine frame 2 which is supported by a chassis 4 that comprises at least three ground-engaging units, each of which is connected to the machine frame 2 via a height adjustment device in the design of lifting columns 5. As is evident from FIG. 1, the embodiment specifies four lifting columns 5 by means of which the machine frame 2 may be brought into a presettable plane extending preferably parallel to the road surface 6 on which the tracked ground-engaging units or wheels of the chassis 4 are standing.

The road milling machine shown in FIG. 1 comprises a milling drum 22 arranged, in longitudinal direction of the milling machine 1a, between the tracked ground-engaging units of the chassis 4.

Figure 2:
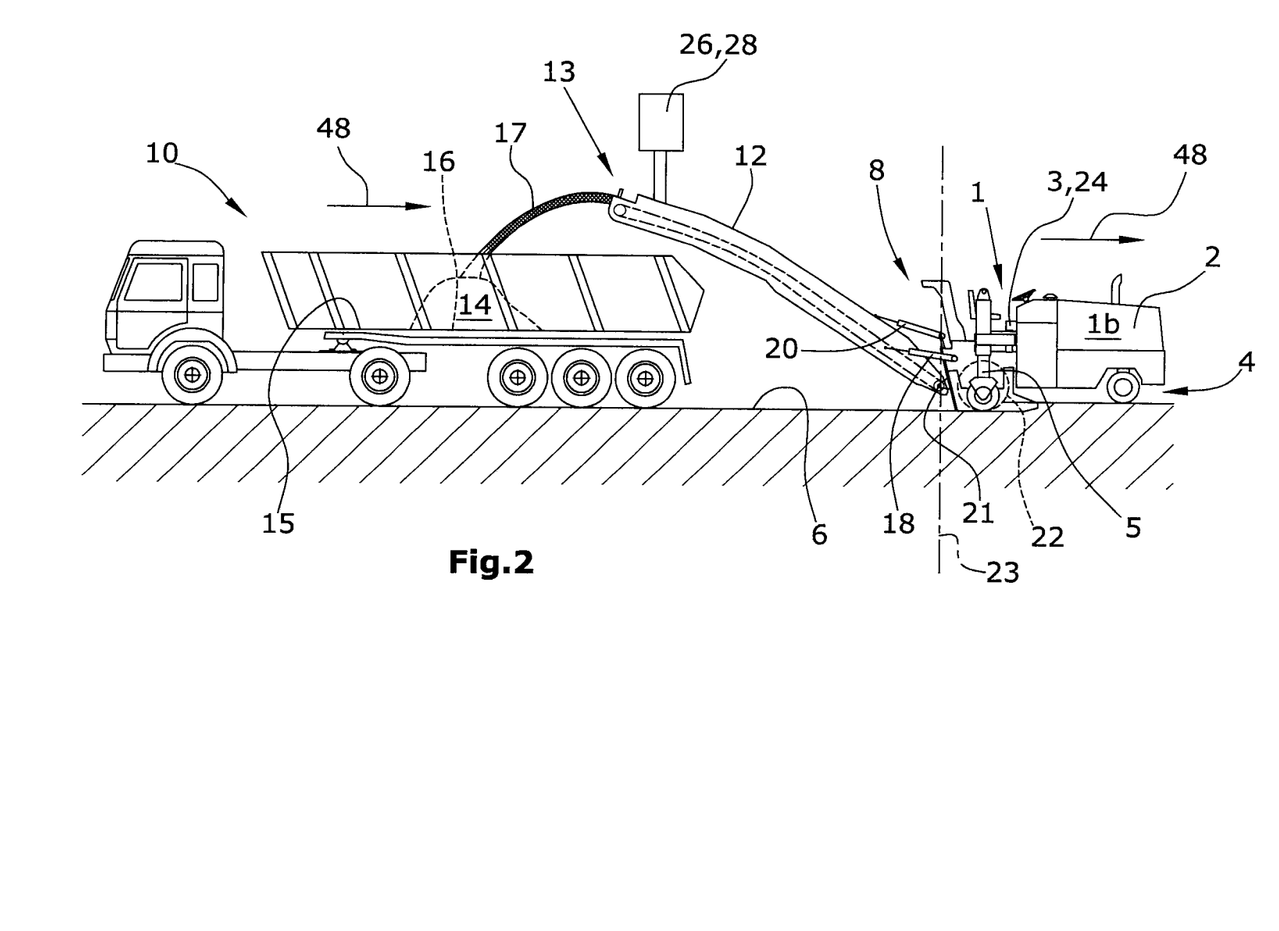
FIG. 2 shows a rear-loading road milling machine.

The ground-engaging units of the milling machines 1a, 1b may comprise track rollers and/or wheels. The milling drum 22 may be adjustable in height via the lifting columns 5 supporting the machine frame 2 and/or relative to the machine frame 2.

The material transport device comprising at least one transport conveyor 11, 12 for transporting away the milled-off milling material 14 may be arranged at the front end 7 or at the rear end 8 of the milling machine 1a, 1b.

FIG. 2 shows the example of a rear-loading milling machine 1b in which the means of transport in the design of a transport vehicle 10 travels behind the milling machine 1b in reverse travel. The milling machine 1b comprises at least one front and at least two rear ground-engaging units, wherein at least the rear ground-engaging units are designed in a height-adjustable fashion for adjusting the milling depth via lifting columns 5.

Provided that sufficient space is available on the side next to the milling machine 1b, the transport vehicle 10 may also be moved next to the rear-loading milling machine 1b in forward travel.

The directions of travel of the respective milling machines 1a, 1b and transport vehicles 10 are each indicated the figures by arrows 48.

In the embodiment according to FIG. 1, the milling material 14 milled off by the milling drum 22 is unloaded, via a first fixed transport conveyor 11, onto a second slewable transport conveyor 12 and then onto the loading surface 15 of the transport vehicle 10. Due to the conveying speed of the transport conveyor 12, the milling material 14 is not unloaded immediately at the end of the transport conveyor 12, but the milling material follows a parabolic trajectory 17 so that the point of impingement 16 on the loading surface 15 features a calculable distance from the free end 13 of the transport conveyor 12. The transport conveyor 12 may be slewed from a neutral position to the left or to the right via piston-cylinder units 18 in order to be able to unload the milling material 14 onto the loading surface 15 even when cornering or in the event of the transport vehicle 10 driving in an offset track. Furthermore, the operator of the milling machine 1a, 1b may adjust the elevation angle of the transport conveyor 12 by means of a piston-cylinder unit 20. The elevation angle influences the parabolic trajectory 17 of the milling material 14 and therefore the position of the point of impingement 16, as does the conveying speed of the transport conveyor 12.

Figure 3:
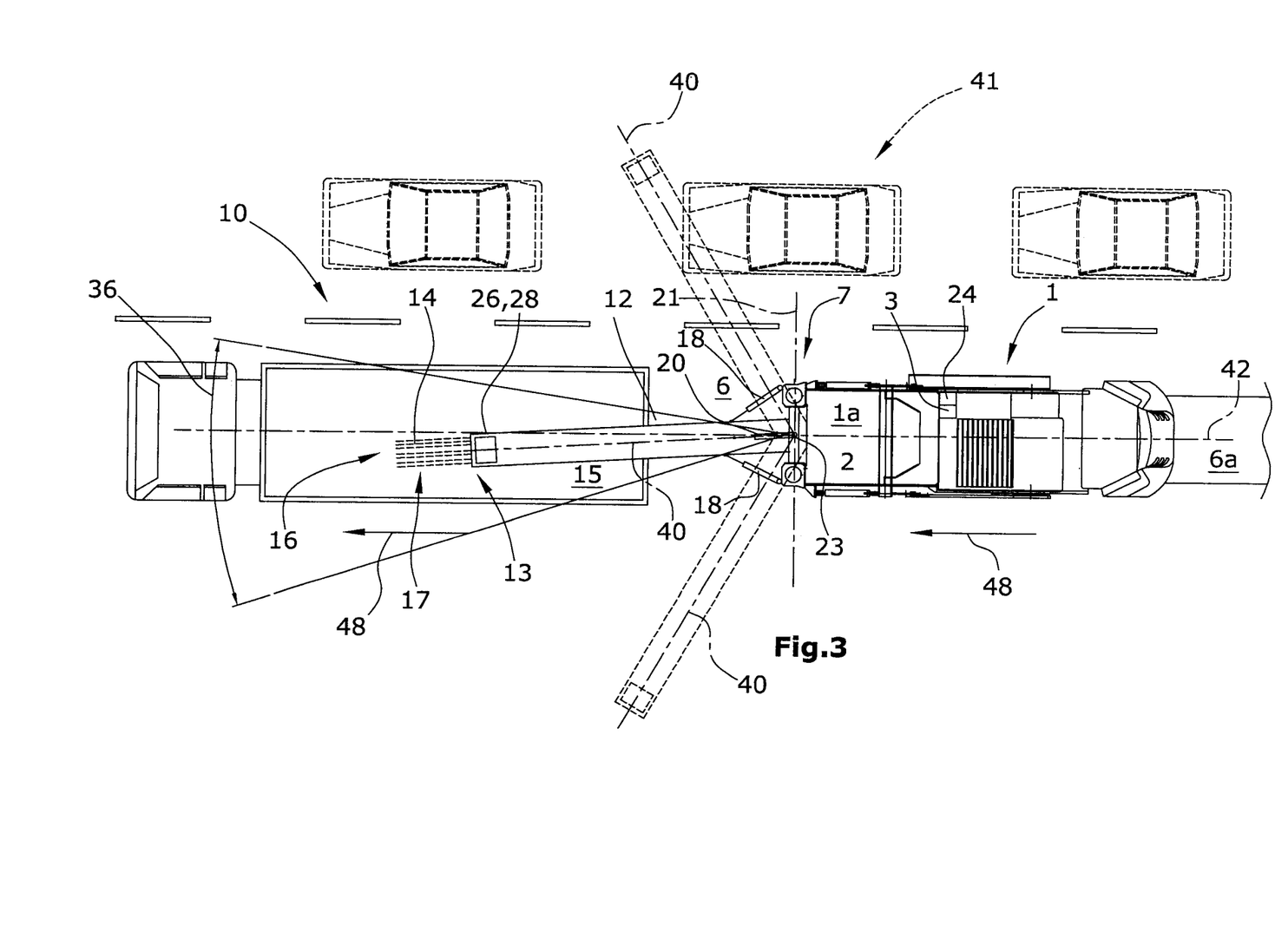
FIG. 3 shows a top view of a milling machine according to FIG. 1.

FIG. 3 shows an embodiment during straight-ahead travel and in flowing traffic 41. The milling machine 1a, with its longitudinal central axis 42, loads the loading surface 15 of the transport vehicle 10, wherein a slewing angle range 36 for the transport conveyor 12 may be determined by a control system 24. As is evident from FIG. 3, the slewing angle range 36 may be unsymmetrical, in relation to the longitudinal central axis 42 of the milling machine 1, and in relation to the longitudinal central axis 40 of the transport conveyor 12, with regard to a central position of 0° in which the longitudinal central axis 40 of the transport conveyor 12 is in alignment with the longitudinal central axis 42 of the milling machine 1. As is, in principle, known from DE 10 2014 216 713 A, said slewing angle range 36 may be calculated and varied dynamically by the control system 24 as a function of the operating situation. The extreme positions of the transport conveyor in the maximum slewed position towards the left or right, respectively, are depicted in dashed lines.

The currently adjusted elevation angle about a horizontal first axis 21 or slewing angle about a vertical second axis 23, respectively, may be reported to the control system 24, which may further comprise at least one detector 26 which continuously detects the position of the loading surface 15 and/or of the last or single transport conveyor 12 as seen in the direction of transport. Said detector 26 may be arranged either on the milling machine 1a, 1b, at the end facing the material transport device, or at the free end 13 of the transport conveyor 12.

The control system 24 may be integrated into the controller 3 for the travelling and milling operation or may, as a minimum, be connected to the same in order to also obtain machine data, where appropriate, for example, on the travel speed and/or a detected steering angle of the milling machine 1a, 1b and the conveying speed of the transport conveyor 12.

In a particular embodiment, the controller 3 or the control system 24, respectively, may detect the alterable position of the loading surface 15 of the transport vehicle 10 relative to the machine frame 2 (position angle 47, FIG. 5), or the alterable position of the loading surface 15 of the transport vehicle 10 relative to the transport conveyor 12 (position angle 46, FIG. 5), and automatically determine limit values for the currently maximum slewing angle range 36 as a function of the position of the detected loading surface 15 and/or the elevation angle adjusted and/or the conveying speed and/or a current steering angle of the milling machine 1 and/or the distance between the milling machine 1 and the transport vehicle 10.

In said particular embodiment, the control system 24 may continuously detect the position of the loading surface 15 and/or of the slewable transport conveyor 12 by means of an image-recording system 28 or a non-optical electronic location system which supplies data for determining the position of the loading surface 15 in relation to the machine frame 2 or to the transport conveyor 12. The information provided by the image-recording system 28 may be evaluated by means of image-analysing methods known per se.

The loading surface 15 may be detected as described, in principle, in DE10 2012 215 013A. The position angle 46 between the respective longitudinal central axes of the loading surface 15 and the transport conveyor 12 may be detected directly by detecting the position of the loading surface 15 relative to the transport conveyor 12 or, with the slewing angle of the transport conveyor 12 being known, indirectly by detecting the position angle 47 between the loading surface 15 and the machine frame 2.

If the geometry of the loading surface 15 is known, for example, through measuring or through given data, the position of the loading surface may, for example, be detected by detecting a corner of the loading surface 15 and a longitudinal or transverse edge of the loading surface 15.

The transverse inclination of the loading surface 15 relative to the horizontally aligned milling machine 1 may be detected, for example, by detecting the positions of the two rear corners of the loading surface 15 in combination with the position angle 46 or 47. With a position angle 46 or 47 of 0°, with the geometry being known, and especially with the distance of the corner points of the loading surface from one another being known, the angle of inclination of the loading surface 15 may be determined, for example, by means of the horizontal distance between the detected positions of the rear corners. If the position angle 46 or 47 deviates from 0°, the detected position data must be converted. If the milling machine 1 is not in horizontal alignment, this may be detected by a cross slope sensor usually in place on the milling machine, and included in the calculation. In this arrangement, the detection of the transverse inclination of the loading surface 15 refers to a transverse inclination about the longitudinal central axis 9 of the loading surface 15 relative to a horizontally aligned loading surface 15.

Alternatively, distance measurements from one or multiple defined starting points to the detected corners may be performed which enable the transverse inclination of the loading surface 15 to be calculated from the geometrical conditions. The distance measurements may be performed, for example, starting from the machine frame 2.

The distance measurement between the milling machine and the transport vehicle 10 may be performed via the position detection of the loading surface 15 or via one or multiple additional distance sensors.

Positioning of the point of impingement 16 of the milling material 14 is calculated in advance via at least one of the following control parameters, namely, the slewing angle, the elevation angle and the conveying speed of the transport conveyor 12, and continuously controlled automatically in such a fashion that the discharged milling material 14 impinges on the pre-calculated point of impingement 16 within the loading surface 15. In this arrangement, correction factors for the at least one control parameter are determined as a function of at least one of the following parameters describing the alterable position of the loading surface 15, namely, the transverse inclination of the loading surface 15 about the longitudinal central axis 9 of the loading surface 15, a position angle between the longitudinal central axis 9 of the loading surface 15 and the longitudinal central axis 40 of the transport conveyor 12 or the longitudinal central axis 42 of the milling machine 1, and the position of the pre-calculated point of impingement 16 relative to an end 50, 51 of the loading surface 15 lying on the longitudinal central axis 9.

Figures 4A, 4B:
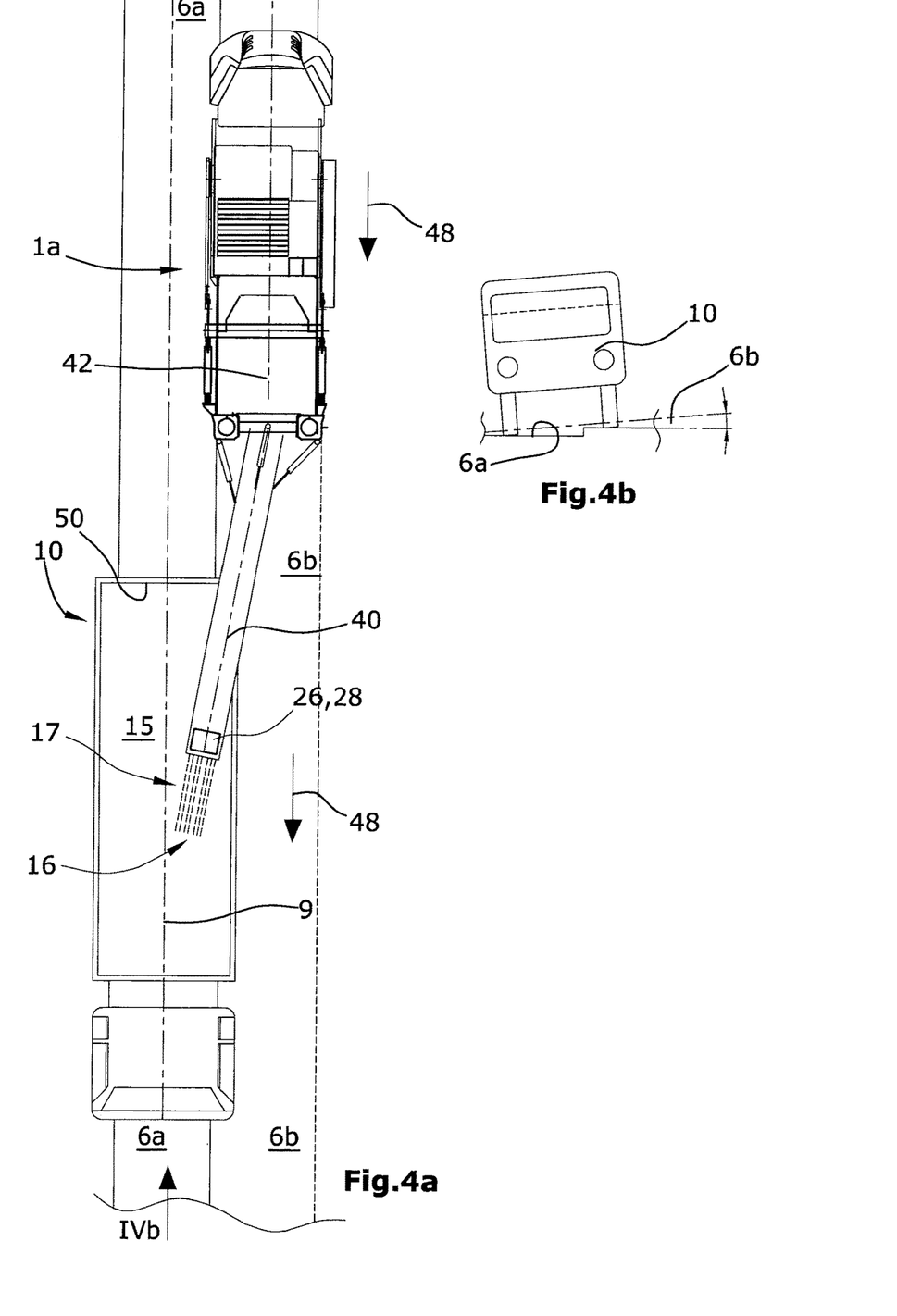
FIGS. 4a and 4b show the correction based on a transverse inclination of the means of transport relative to the milling machine, FIG. 5 show the correction based on the position angle between the transport conveyor and the loading surface.

FIGS. 4a and 4b illustrate the correction of the slewing angle calculated and specified by the automatic control system 24 on the basis of a transverse inclination of the transport vehicle 10 relative to the milling machine 1a, 1b. In said embodiment, the transport vehicle drives on the previously milled cut 6a on the one side, and on the as yet non-milled section of the milling cut 6b on the other side, as can best be inferred from FIG. 4b. As a result, the loading surface 15 exhibits a transverse inclination.

Due to said transverse or lateral inclination of the loading surface 15 about the longitudinal central axis 9 of the loading surface 15, the milling material may, following the inclination, concentrate on one side of the loading surface, which may result in non-uniform loading of the loading surface. As a result, the loading volume can, for example, not be fully utilized. Non-uniform loading may preferably be compensated for by correcting the slewing angle of the transport conveyor 12 in that the slewing angle preset by the controller 3 or the control system 24 is corrected in the direction of the transverse inclination by means of the correction factor in such a fashion that the slewing angle is increased in the direction of the elevated side, that is, in the direction of the excessive elevation of the transverse inclination.

In the embodiment according to FIG. 4a, this means that the calculated point of impingement 16 is shifted towards the right in the illustration, or towards the left in the direction of operation, respectively, through the correction made.

It is understood that, in the case of a lateral or transverse inclination of the loading surface 15, the position of the point of impingement 16 may also be altered by an alteration of the conveying speed and/or the elevation angle in combination with a corrected slewing angle.

Figure 5:
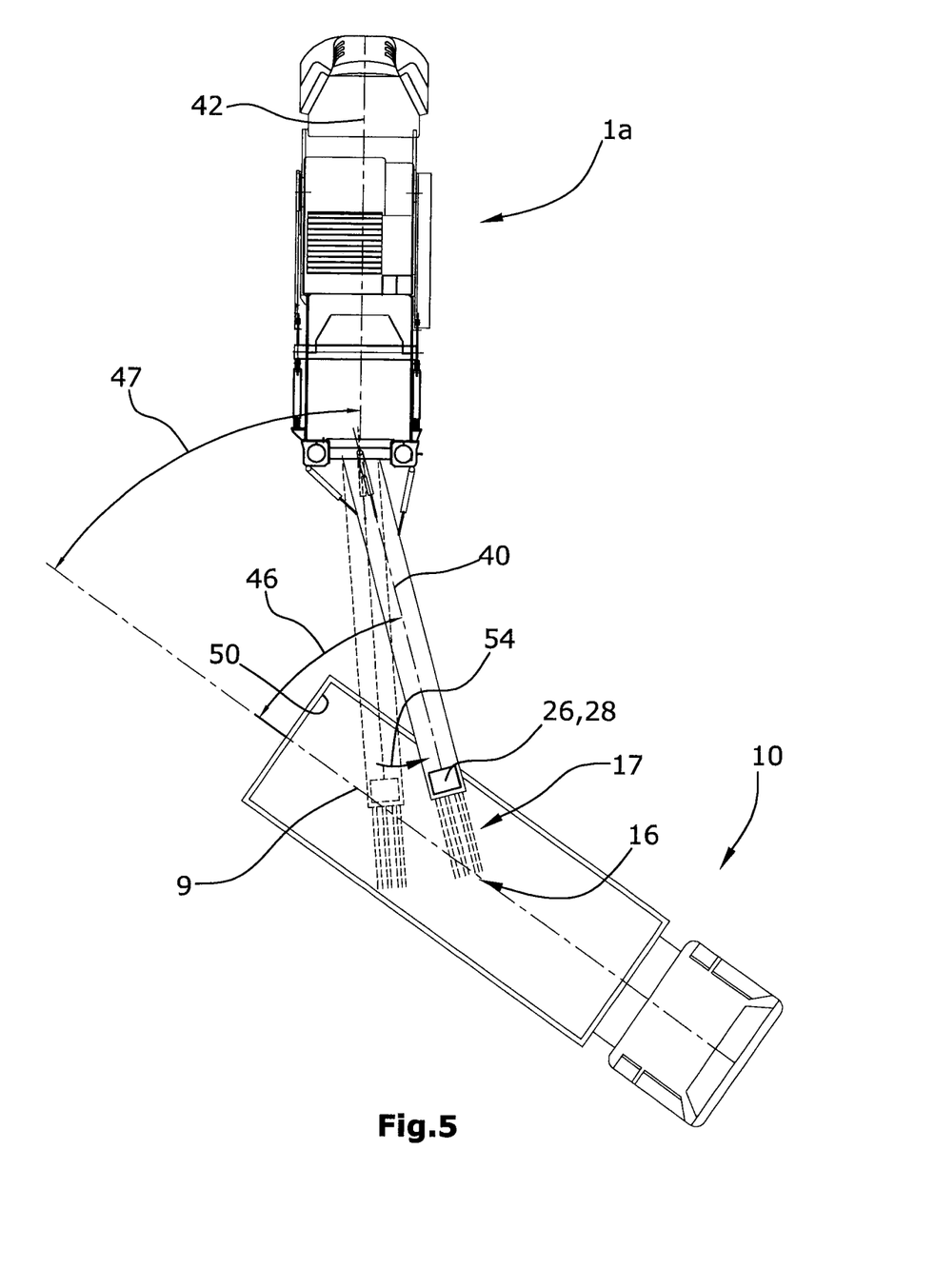

FIG. 5 illustrates the correction of the slewing angle based on an altered position angle 46 between the longitudinal central axis 40 of the transport conveyor 12, or the longitudinal central axis 42 of the machine frame 2, and the longitudinal central axis 9 of the loading surface 15. It is understood that, with the slewing angle being known, the position of the longitudinal central axes 40 and 42 relative to one another can be calculated. It follows that, with the position angle 47 between the longitudinal central axis 42 of the machine frame 2 and the longitudinal central axis 9 of the loading surface 15 being known, it is also possible to determine the position angle 46 between the longitudinal central axis 40 of the transport conveyor and the longitudinal central axis 9 of the loading surface 15 and vice versa.

The further correction factor calculated by the control system 24 is preferably a second correction factor for the slewing angle and is determined in such a fashion that the slewing angle to be preset is increased in the direction of the increase of the position angle 46. With reference to the embodiment shown in FIG. 5, this means that the calculated slewing angle is corrected in the direction of the arrow 54 when the position angle 46 or the angle between the longitudinal central axes 9 and 42 increases. When the position angle 46 decreases in the direction of the initial position in which the longitudinal central axis 9 extends collinearly to the longitudinal central axis 40, the corrected slewing angle to be preset is altered in the opposite direction, compared to the calculated slewing angle, until it coincides, in the initial position, with the non-corrected, pre-calculated slewing angle.

The transport conveyor 12 illustrated in dashed lines shows the slewing angle pre-calculated automatically by the control system 24 without the correction according to the invention, which is corrected in the direction of the arrow in such a fashion that the point of impingement 16 of the milling material 3 assumes the corrected position illustrated in solid lines.

Figure 6A:
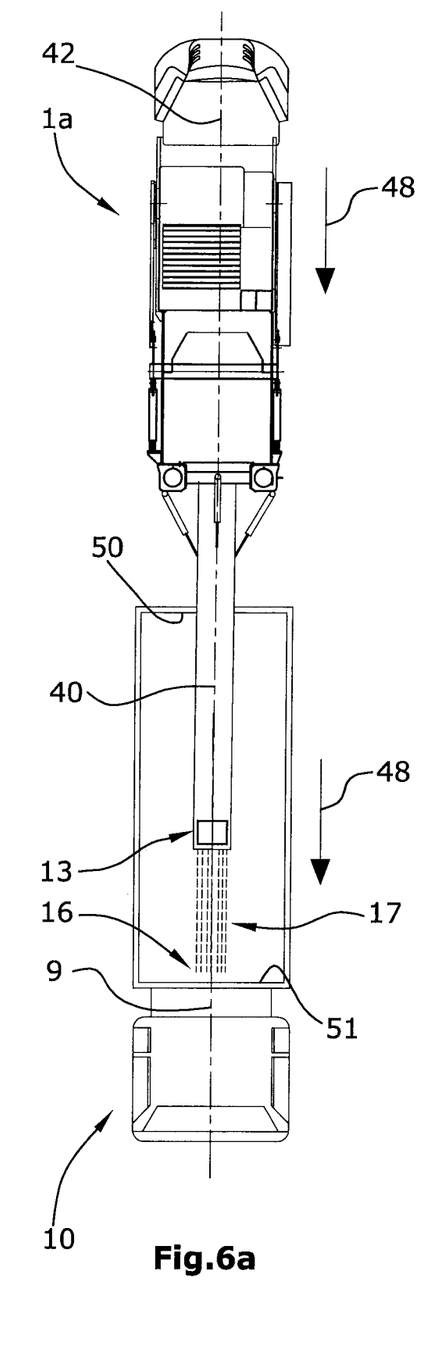
FIGS. 6a and 6b show the correction based on the position of the pre-calculated point of impingement relative to the loading surface.
Figure 6B:
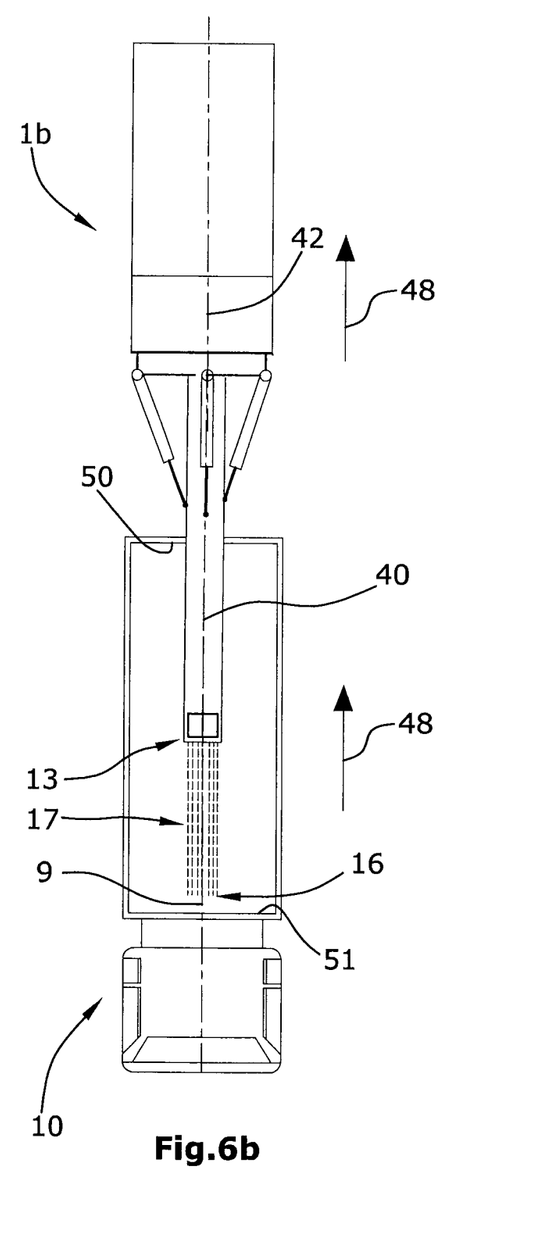
Figure 7:
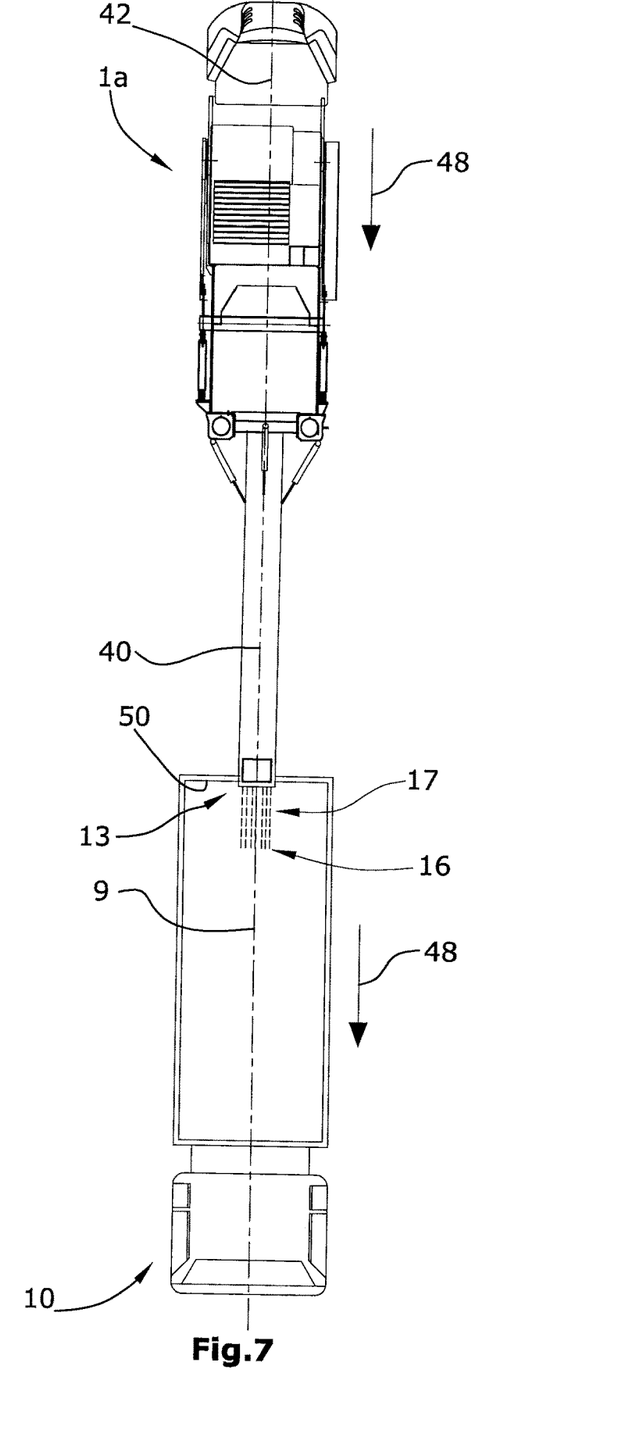
FIG. 7 shows the correction of the length of the parabolic trajectory at the rear end of the loading surface.

FIGS. 6a, 6b and 7 illustrate the correction factor for the conveying speed to be preset as a function of the position of the pre-calculated point of impingement 16 within the loading surface 15.

It is specified in this design for the conveying speed to be increased steplessly up to the maximum when the point of impingement 16 moves in the direction of the forward end 51 of the loading surface 15. The term forward/rear end (51, 50) of the loading surface 15 does not refer to the current direction of operation but to the normal direction of forward travel of the transport vehicle 10.

It is illustrated in FIGS. 6a and 6b that the length of the parabolic trajectory 17 of the milling material 14 is at the maximum when the point of impingement 16 is at the forward end 51 of the loading surface 15. This applies both to a front-loading milling machine 1a and to a rear-loading milling machine 1b in which the transport vehicle 10 moves in reverse travel.

It is evident from FIG. 7 that the conveying speed is reduced and the parabolic trajectory 17 is shortened accordingly in the event that the calculated point of impingement 16 is close to the rear end 50 of the loading surface 15.

In this case the conveying speed is preferably reduced steplessly to a minimum the more the point of impingement 16 approaches the rear loading edge at the rear end 50 of the loading surface 15.

The conveying speed may, for example, be reduced compared to the maximum conveying speed to a minimum value of 60%, preferably 70%, of the maximum conveying speed when the point of impingement 16 moves in the direction of the rear end 50 of the loading surface 15.

What is claimed is:

1. A self-propelled milling machine for milling a ground surface, the milling machine comprising:
   a machine frame with a longitudinal central axis, extending longitudinally as seen in a direction of travel;
   a height-adjustable milling drum;
   a slewable transport conveyor with a longitudinal central axis, arranged in front of or behind the milling drum as seen in the direction of travel of the milling machine, which unloads milling material worked off by the milling drum onto a point of impingement on a loading surface having a longitudinal central axis,
   wherein the transport conveyor is slewable, relative to the machine frame, about a first axis extending transverse to the longitudinal central axis of the machine frame under an elevation angle, and laterally about a second, essentially vertical axis extending orthogonally to the first axis under a slewing angle; and
   a controller configured to
     continuously locate an alterable position of the loading surface and of the slewable transport conveyor relative to the machine frame, or the alterable position of the loading surface relative to the transport conveyor,
     automatically control at least one of the slewing angle, the elevation angle and a conveying speed of the transport conveyor, in such a fashion that discharged milling material impinges on a pre-calculated point of impingement within the loading surface, and
     determine a corrected point of impingement as a function of at least one of:
       a transverse inclination about the longitudinal central axis of the loading surface,
       a position angle between the longitudinal central axis of the loading surface and the longitudinal central axis of the transport conveyor or the longitudinal central axis of the machine frame, and
       a position of the pre-calculated point of impingement relative to an end of the loading surface lying on the longitudinal central axis of the loading surface; and
     determine correction factors for the at least one of the slewing angle, the elevation angle, and the conveying speed of the transport conveyor, such that the discharged milling material impinges on the corrected point of impingement.

2. The self-propelled milling machine of claim 1, wherein the controller is configured to determine a correction factor for the slewing angle as a function of the transverse inclination of the loading surface such that a preset slewing angle is increased in the direction of an excessive elevation of the transverse inclination.

3. The self-propelled milling machine of claim 2, wherein the controller is configured to determine a further correction factor for at least one of the slewing angle, the elevation angle and the conveying speed of the transport conveyor as a function of the position angle between the longitudinal central axis of the transport conveyor and the longitudinal central axis of the loading surface, or as a function of the position angle between the longitudinal central axis of the machine frame and the longitudinal central axis of the loading surface.

4. The self-propelled milling machine of claim 3, wherein the controller is configured to determine a further correction factor for a slewing angle to be preset as a function of the position angle such that the slewing angle to be preset is increased in the direction of the alteration of the position angle.

5. The self-propelled milling machine of claim 1, wherein the controller is configured to determine a further correction factor for the elevation angle and/or the conveying speed of the transport conveyor as a function of the position of the pre-calculated point of impingement relative to a forward or rear end of the loading surface.

6. The self-propelled milling machine of claim 5, wherein the controller is configured to determine a further correction factor for the conveying speed as a function of the position of the pre-calculated point of impingement within the loading surface in such a fashion that the conveying speed is increased steplessly up to a maximum conveying speed when the point of impingement moves in the direction of the forward end of the loading surface as seen in a conveying direction, and the conveying speed is reduced compared to the maximum conveying speed when the point of impingement moves in the direction of the rear end of the loading surface.

7. The self-propelled milling machine of claim 6, wherein the conveying speed is reduced compared to the maximum conveying speed to a defined minimum value of the maximum conveying speed when the point of impingement moves in the direction of the rear end of the loading surface.

8. A method for automatically loading a loading surface of a means of transport with milling material via a transport conveyor of a self-propelled milling machine, wherein each of the loading surface, the transport conveyor, and the milling machine feature a respective longitudinal central axis, the method comprising:
   continuously locating alterable positions of the loading surface and of the transport conveyor relative to a machine frame, or the alterable position of the loading surface relative to the transport conveyor;
   automatically controlling positioning of a point of impingement of the milling material via at least one of a slewing angle, an elevation angle and a conveying speed of the transport conveyor, wherein discharged milling material impinges on a pre-calculated point of impingement within the loading surface;
   determining a corrected point of impingement as a function of at least one of:
      a transverse inclination of the loading surface about the longitudinal central axis of the loading surface;
      a position angle between the longitudinal central axis of the loading surface and the longitudinal central axis of the transport conveyor or the longitudinal central axis of the milling machine, and
      a position of the pre-calculated point of impingement relative to an end of the loading surface lying on the longitudinal central axis of the loading surface; and
   determining correction factors for the at least one of the slewing angle, the elevation angle and the conveying speed of the transport conveyor, such that the discharged milling material impinges on the corrected point of impingement.

9. The method of claim 8, wherein a first correction factor for the slewing angle is determined as a function of the transverse inclination of the loading surface such that the slewing angle is increased in the direction of an excessive elevation of the transverse inclination.

10. The method of claim 9, wherein a further correction factor for at least one of the at least one of the slewing angle, the elevation angle and the conveying speed of the transport conveyor is determined as a function of the position angle between the longitudinal central axis of the transport conveyor and the longitudinal central axis of the loading surface, or the position angle between the longitudinal central axis of the milling machine and the longitudinal central axis of the loading surface.

11. The method of claim 10, wherein a second correction factor for the slewing angle is determined as a function of the position angle such that the slewing angle is increased in a direction of the alteration of the position angle.

12. The method of claim 10, wherein responsive to an increasing amount of the position angle, the conveying speed of the transport conveyor and/or the elevation angle is reduced.

13. The method of claim 8, wherein a further correction factor for the elevation angle and/or the conveying speed is determined as a function of the position of the pre-calculated point of impingement relative to a forward or rear end of the loading surface.

14. The method of claim 8, wherein a further correction factor for the conveying speed is determined as a function of the position of the pre-calculated point of impingement within the loading surface in such a fashion that the conveying speed is increased steplessly up to a maximum conveying speed when the point of impingement (16) moves in a direction of the forward end of the loading surface as seen in a conveying direction, and the conveying speed is reduced compared to the maximum conveying speed when the point of impingement moves in a direction of the rear end of the loading surface.

15. A road or ground working system comprising:
   a self-propelled milling machine; and
   at least one transport vehicle having a respective loading surface movable independently of the milling machine and positionable relative to the milling machine such that milling material worked off by the milling machine is unloadable onto the loading surface,
   wherein the milling machine comprises
      a machine frame with a longitudinal central axis, extending longitudinally as seen in a direction of travel;
      a height-adjustable milling drum;
      a slewable transport conveyor with a longitudinal central axis, arranged in front of or behind the milling drum as seen in the direction of travel of the milling machine, which unloads the milling material worked off by the milling drum onto a point of impingement on the loading surface having a longitudinal central axis,
      wherein the transport conveyor is slewable, relative to the machine frame, about a first axis extending transverse to the longitudinal central axis of the machine frame under an elevation angle, and laterally about a second, essentially vertical axis extending orthogonally to the first axis under a slewing angle; and
      a controller configured to
         continuously locate an alterable position of the loading surface and of the slewable transport conveyor relative to the machine frame, or the alterable position of the loading surface relative to the transport conveyor,
         automatically control at least one of the slewing angle, the elevation angle and a conveying speed of the transport conveyor, in such a fashion that discharged milling material impinges on a pre-calculated point of impingement within the loading surface, and determine a corrected point of impingement as a function of at least one of:
- a transverse inclination about the longitudinal central axis of the loading surface,
- a position angle between the longitudinal central axis of the loading surface and the longitudinal central axis of the transport conveyor or the longitudinal central axis of the machine frame, and
- a position of the pre-calculated point of impingement relative to an end of the loading surface lying on the longitudinal central axis of the loading surface: and determine correction factors for the at least one of the slewing angle, the elevation angle, and the conveying speed of the transport conveyor, such that the discharged milling material impinges on the corrected point of impingement.

16. The system of claim 15, wherein the controller is configured to determine a correction factor for the slewing angle as a function of the transverse inclination of the loading surface such that the slewing angle is increased in the direction of an excessive elevation of the transverse inclination.

17. The system of claim 16, wherein the controller is configured to determine a further correction factor for at least one of the slewing angle, the elevation angle and the conveying speed of the transport conveyor as a function of the position angle between the longitudinal central axis of the transport conveyor and the longitudinal central axis of the loading surface, or as a function of the position angle between the longitudinal central axis of the machine frame and the longitudinal central axis of the loading surface.

18. The system of claim 17, wherein the controller is configured to determine a further correction factor for the slewing angle as a function of the position angle such that the slewing angle is increased in the direction of the alteration of the position angle.

19. The system of claim 15, wherein the controller is configured to determine a further correction factor for the elevation angle and/or the conveying speed of the transport conveyor as a function of the position of the pre-calculated point of impingement relative to a forward or rear end of the loading surface.

20. The system of claim 15, wherein the controller is configured to determine a further correction factor for the conveying speed as a function of the position of the pre-calculated point of impingement within the loading surface in such a fashion that the conveying speed is increased steplessly up to a maximum conveying speed when the point of impingement moves in a direction of the forward end of the loading surface as seen in a conveying direction, and the conveying speed is reduced compared to the maximum conveying speed when the point of impingement moves in a direction of the rear end of the loading surface.

* * * * *